United States Patent [19]

Lindhal

[11] Patent Number: 5,442,877
[45] Date of Patent: Aug. 22, 1995

[54] MODULAR LANDSCAPE BORDERS

[76] Inventor: John R. Lindhal, 5375 Circle Rd., Rathdrum, Id. 83858

[21] Appl. No.: 223,552

[22] Filed: Apr. 6, 1994

[51] Int. Cl.$^6$ ............................................. A01G 1/08
[52] U.S. Cl. ........................................ 47/33; 52/102; 52/298; 174/38; 174/39
[58] Field of Search ..................... 47/33; 404/7, 8; 52/102, 300, 298; 174/38, 39

[56] References Cited

U.S. PATENT DOCUMENTS

| | | | |
|---|---|---|---|
| 2,281,092 | 4/1942 | Andrews | 47/300 |
| 2,554,779 | 5/1951 | Goodwin | 52/300 |
| 3,203,327 | 8/1965 | Daley | 404/7 |
| 3,515,373 | 6/1970 | Abbe | 47/102 |
| 3,545,128 | 12/1970 | La Fontaine et al. | 47/33 |
| 3,676,952 | 7/1972 | Watts | 47/33 |
| 3,762,113 | 10/1973 | O'Mullan | 404/7 |
| 3,788,001 | 1/1974 | Balfanz, Jr. | 47/32 |
| 3,841,022 | 10/1974 | Thodos | 47/33 |
| 3,933,311 | 1/1976 | Lemelson | 239/276 |
| 4,074,479 | 2/1978 | Krupka | 404/7 |
| 4,281,473 | 8/1981 | Emalfarb et al. | 47/33 |
| 4,644,685 | 2/1987 | Tisbo et al. | 47/33 |
| 4,702,034 | 10/1987 | Ferguson | 47/33 |
| 4,761,923 | 8/1988 | Reum et al. | 52/102 |
| 4,823,521 | 4/1989 | Kontz, Jr. | 52/102 |
| 4,858,379 | 8/1989 | West | 47/33 |
| 4,905,409 | 3/1990 | Cole | 47/33 |
| 4,969,289 | 11/1990 | Trifiletti | 47/33 |
| 4,976,063 | 12/1990 | Young | 52/102 |
| 5,067,273 | 11/1991 | Richwine | 47/33 |
| 5,121,569 | 6/1992 | Thomas | 47/33 |

FOREIGN PATENT DOCUMENTS 13983 5/1925 Netherlands ............................ 52/300

Primary Examiner—Henry E. Raduazo
Attorney, Agent, or Firm—Frank J. Dykas

[57] ABSTRACT

The invention is a modular landscape edging system comprising a plurality of generally V-shaped edging modules and a plurality of connecting modules. The edging module possesses sheaths for receiving an anchor. The edging module is shaped such that it is stackable. In any embodiment of the invention the edging module or an angled connecting module may optionally possesses a circular accessory opening in the top edging surface for including accessories such as lamp posts or sprinkler heads into the edging. In any embodiment of the present invention the edging system can include a grade changing module. The grade changer contains a plurality of vertical support wall pleats that allow the grade changer module to connect a unit of edging module and connector module on a graded surfaces. In any embodiment of the invention the edging system can include an edging module spanner member. The spanner member functions to prevent the collapse and spreading of the edging module.

30 Claims, 15 Drawing Sheets

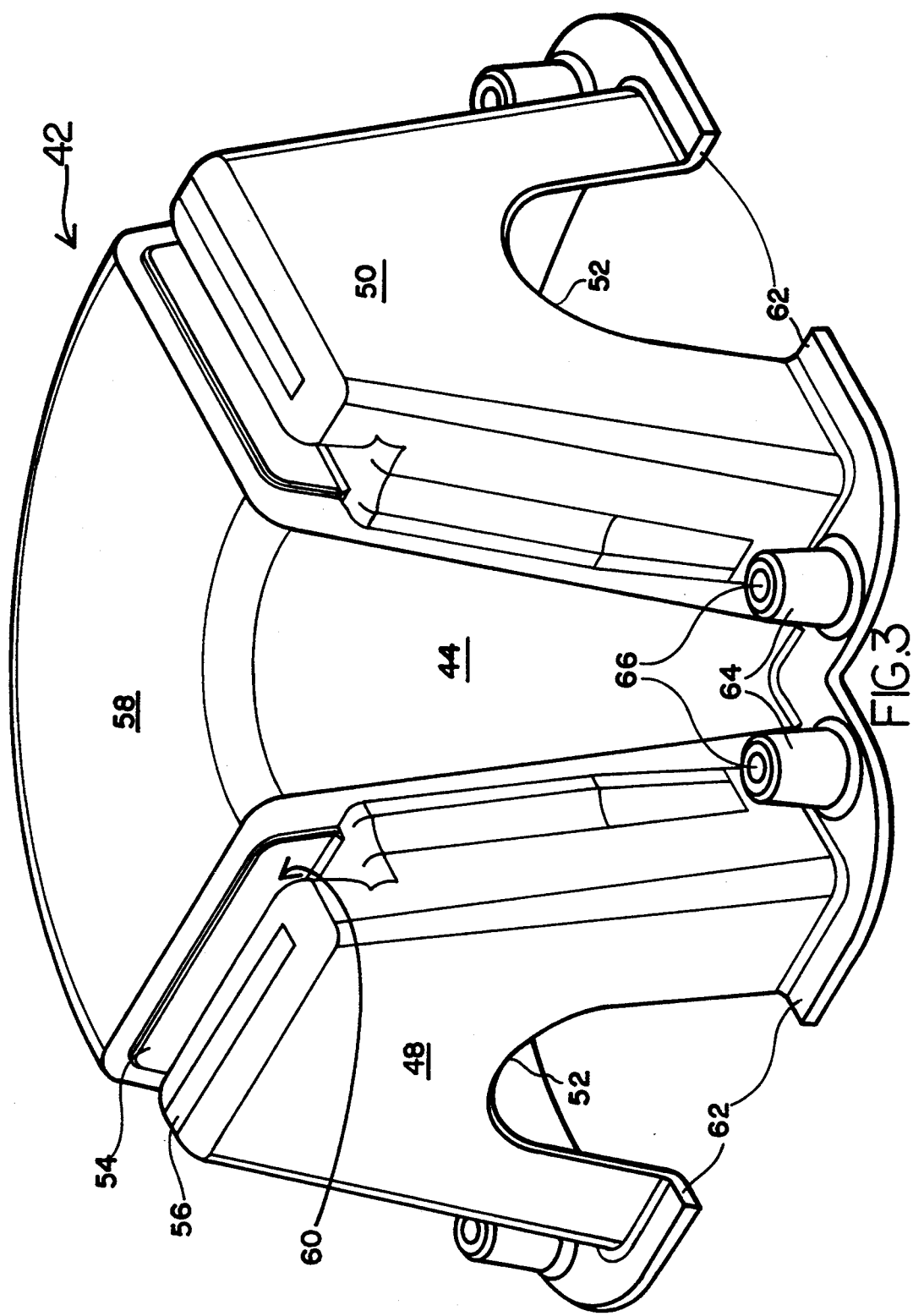

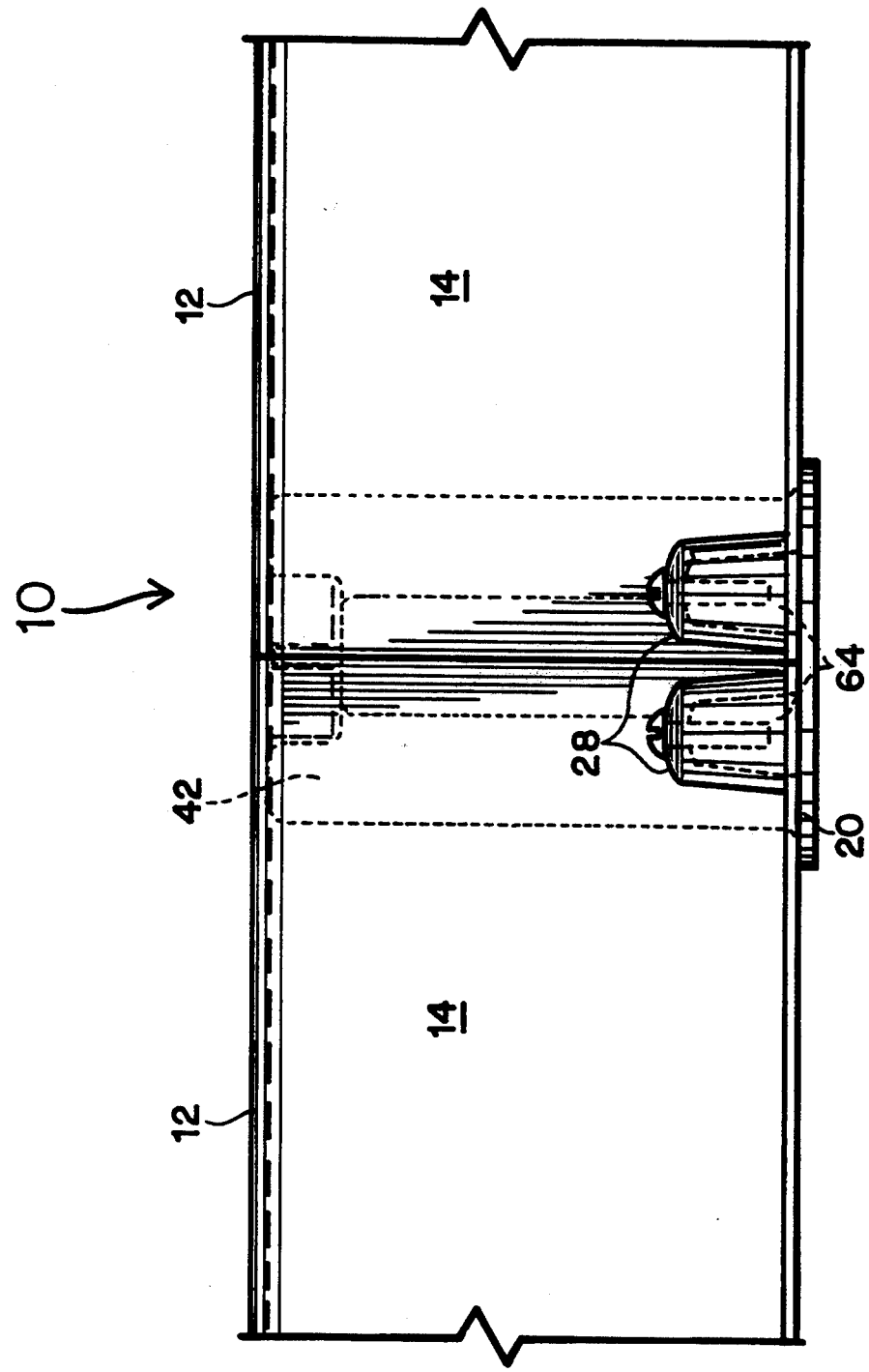

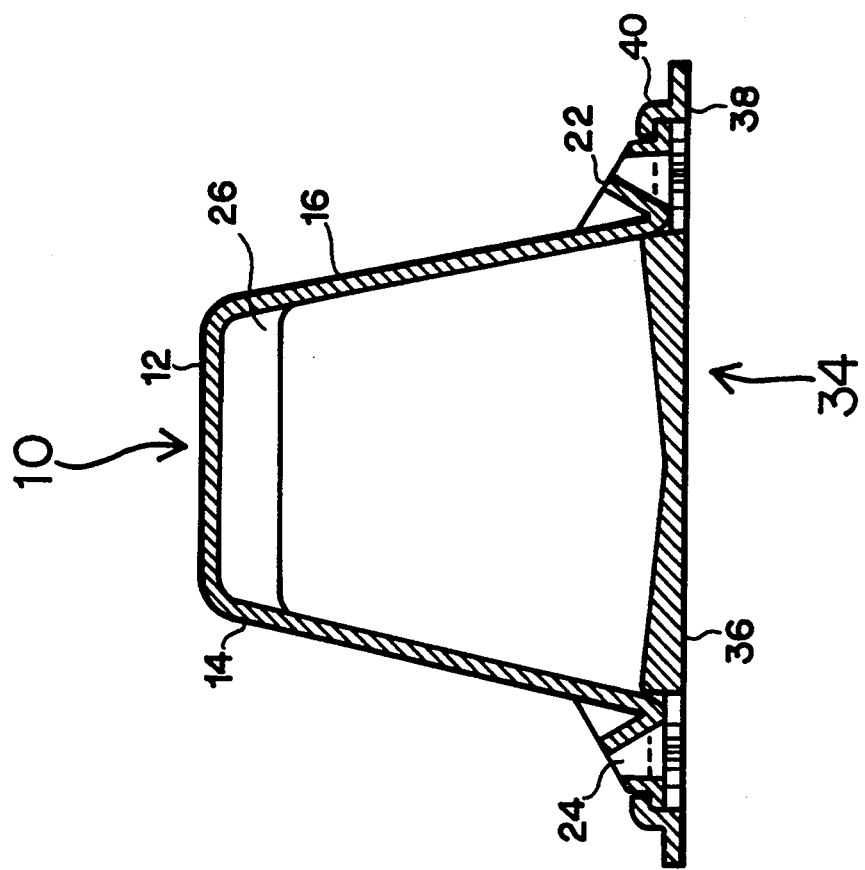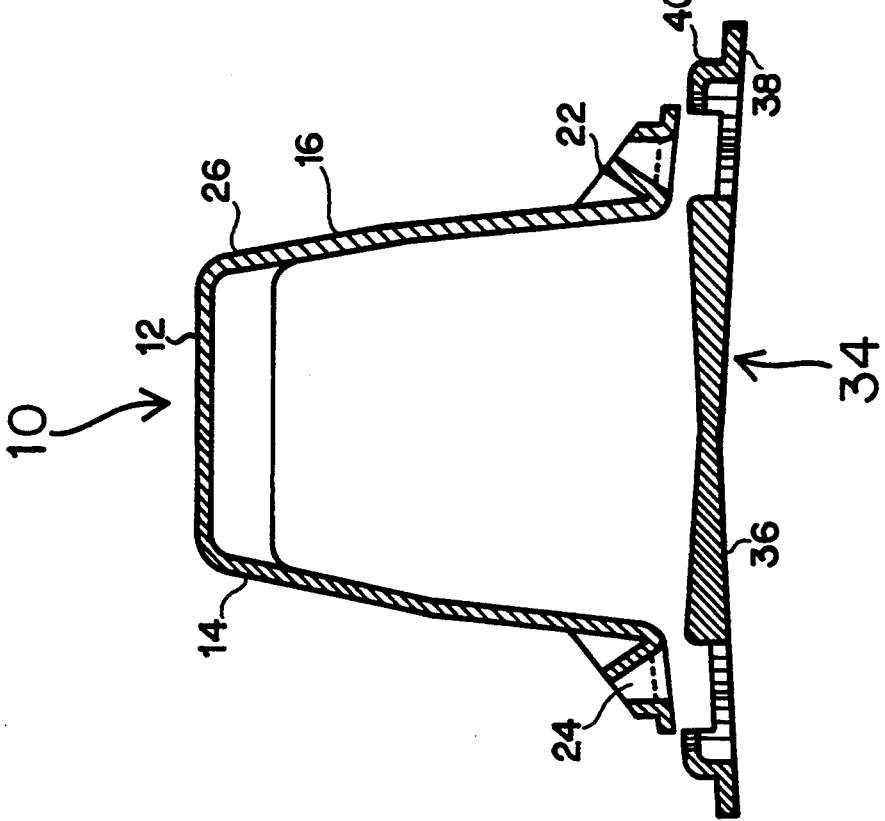
FIG.8C

MODULAR LANDSCAPE BORDERS

BACKGROUND OF THE INVENTION

1. Technical Field

This invention relates in general to systems for edging and bordering gardens and lawns, and more specifically to a modular and stackable border system for gardens and lawns.

2. Background

It is well known in landscaping to utilize physical structures to define garden and lawn boundaries. These physical structures serve a variety of purposes including defining the territorial limits of an area, preventing lawn grass from encroaching into a garden area, or simply to improve the aesthetic value of a landscape area.

A wide variety of structures and edging systems have been developed in the past to border lawns and gardens. These borders have been made out of a number of different materials including wood, cement, rocks, bricks and plastic. Examples of wood border systems include the use of railroad ties and other wood border systems such as those seen in LaFontaine et al., U.S. Pat. No. 3,545,128. LaFontaine et al. shows a system using a wooden border similar to miniature railroad ties, which is an improvement over the railroad ties in that the units are more easily managed and configured. Another example of a wood border system is U.S. Pat. No. 4,905,409 by Cole. The border system in Cole shows the use of timber members which are overlapping and offset. Those members are assembled in an overlapping fashion and joined together to form irregular shapes of border or wall. One limitation of wood borders is that wood generally lends itself only to rectilinear formations. Another problem with wood borders is that over time wood tends to rot and is a soft material which is vulnerable to physical damage.

In response to some of the problems encountered with the use of wood, borders have been constructed out of other materials, including cement and brick. Although cement and brick borders are very long lasting, these materials are cumbersome, heavy and expensive to use in border construction.

Another response to the problems inherent in the use of wood or cement borders has been to construct borders out of plastic materials.

Examples of one general style of plastic borders can be seen in U.S. Pat. No. 3,788,001, Balfant, and U.S. Pat. No. 3,841,022, Thodos. Both of these show plastic segments that are approximately J-shaped with the tail of the J being embedded in the dirt to secure the border and the head of the J forming the above-ground portion of the border.

Another general style of plastic borders can be seen in U.S. Pat. No. 4,281,473, Emalfarb et al., and U.S. Pat. No. 4,644,685, Tisbo et al. These patents both show a thin dividing section which goes below ground with a circular edging portion above ground. Emalfarb shows straight segments of edging, and Tisbo shows a similar border using curved segments. Plastic borders are generally longer wearing than wood borders as well as being lighter and less expensive than cement and brick borders.

Although these borders represent improvements in edging and borders for gardens and lawns, there are still a number of problems inherent in the existing systems. Because of the shapes utilized in existing edging and bordering systems, they are not stackable and consequently are expensive to ship. Traditionally, because of their shape, existing border systems are also bulky and cumbersome to store when not in use. Under many circumstances existing border systems still do not meet the demand for an adaptable and economical functioning border system for a garden or lawn.

What is still needed is an edging or border system that allows custom accommodation to individual landscape plans, including the incorporation of sprinklers, watering systems, lighting systems and signs or other ornaments.

What is also needed is a customizable border that is economical because it is stackable for shipping and storage and tolerates being stacked and stored without damage to individual segments.

What is also needed is an edging system with wide, smooth and arcuately curved segments that connect with one another and to straight segments to form flowing border patterns.

It is therefore an object of this invention to provide an edging system that allows custom construction with provision for inclusion of lamps, electrical wiring, sprinkler heads, pipes and signs or other customization of the edging system. It is a further object of this invention to provide an edging system that is stackable in such a manner that it prevents damage to the surface of the units of the stacking system.

It is also an object of this invention to provide an edging system with wide, smooth and arcuately curved segments that connect with one another and to straight segments to form flowing border patterns.

DISCLOSURE OF INVENTION

The invention is a modular landscape edging system comprising a plurality of generally V-shaped edging modules and a plurality of connecting modules. The edging module possesses a top surface, a pair of vertical support walls, a pair of flanges at the base of the vertical support walls, a pair of recessed cross support members extending downward from the top planar edging surface between the vertical support walls, and a means for receiving an anchoring means. The connecting module possesses a top support surface possessing a center recess, a slot for receiving a cross support; a first and second vertical support wall, first and second side walls which include a pass through opening, a pair of flanges at the base of the vertical support walls, a means for receiving an anchoring means; and an anchoring means.

The edging the module is shaped such that it is stackable. In any embodiment of the invention the edging module may optionally possesses a circular accessory opening in the top planar edging surface for including accessories such as lamp posts or sprinkler heads into the edging.

In one embodiment of the present invention the edging module is curved in an arc.

In another embodiment of the invention the connecting module is curved with an arc that creates an angle between the edging module units attached to the connecting module. The angled connecting module can also possess a generally circular accessory opening.

In any embodiment of the present invention the edging system can include a grade changing module. One end of the grade changing module is configured to be analogous to the edging module and the opposite end of the grade changer is configured to be analogous to the connector module. The vertical support walls of the grade changer contain a plurality of vertical support wall pleats that allow the grade changer module to connect a unit of edging module to a connector module on a graded surfaces.

In any embodiment of this invention the edging system can include a module structure reinforcing spanner member.

BRIEF DESCRIPTION OF THE DRAWINGS

FIG. 3 is a representational perspective view showing the details of 90° corner connecting unit of the preferred embodiment of the present invention.

FIG. 6A is a side view of the present invention showing the fit of a pair of the edging modules with a connecting module.

FIG. 8C is a cross section view showing the use of the module structure reinforcing spanner with the edging module of the present invention.

BEST MODE FOR CARRYING OUT INVENTION

Figure 1:
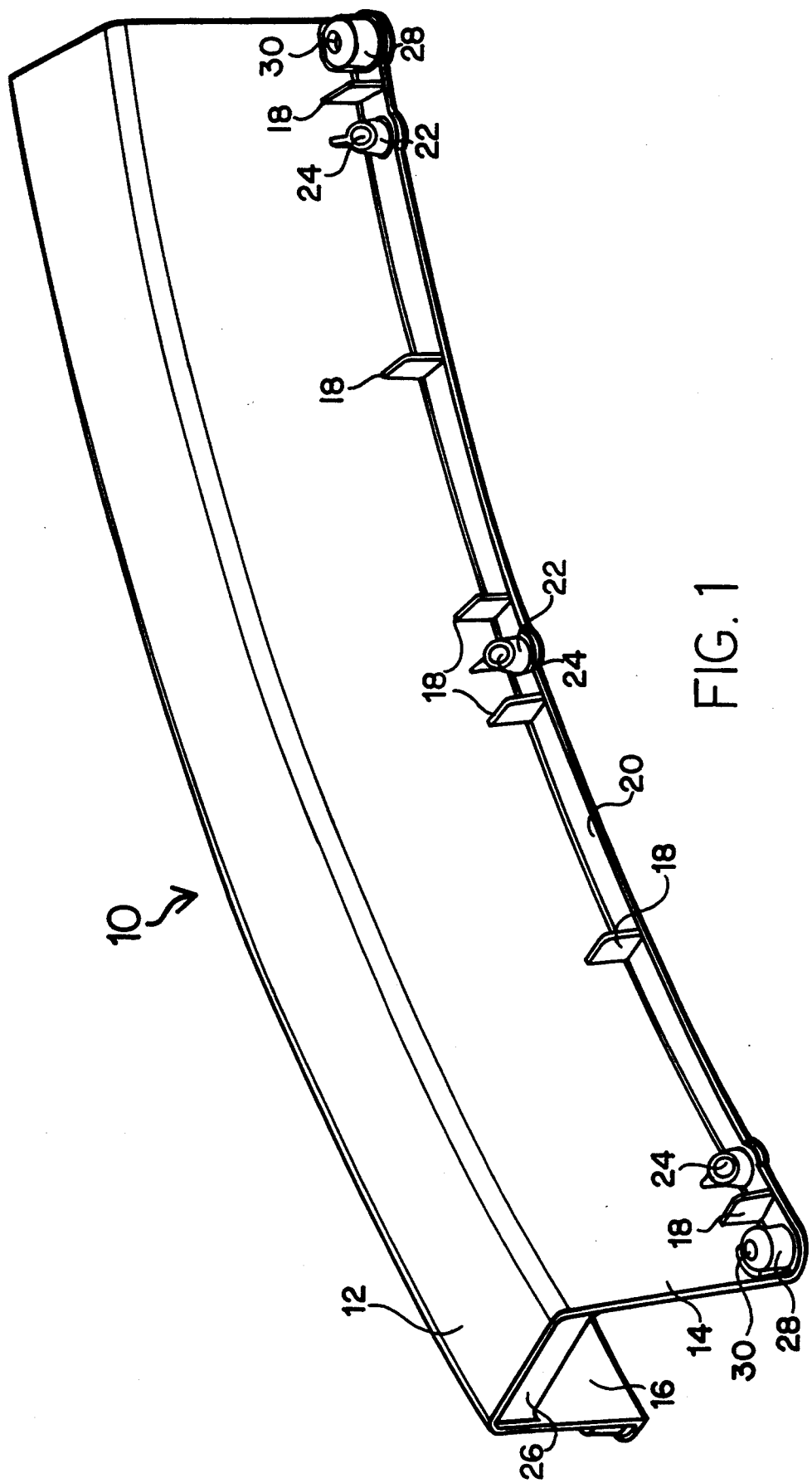
FIG. 1 is a representational perspective view of the preferred embodiment of the edging module of the present invention.

Referring now to FIGS. 1 through 10, a modular landscape border system is illustrated in accordance with the principles of the present invention. The border system is generally comprised of edging module 10 and connecting module 42. Edging module 10 is of generally unitary or integral form, having top edging surface 12, first vertical support wall 14, second vertical support wall 16, a plurality of stacking support members 18, a pair of flanges 20, a pair of recessed cross support members 26 and a plurality of knob receivers 28, as can be seen in FIGS. 1 and 2.

First and second vertical support walls 14 and 16 are attached to top edging surface 12 in such a way that edging module 10 is generally V-shaped and includes in the preferred embodiment a truncated V-shape with a flat vertex and having a divergent cross section. Recessed cross support member 26 is set back from the end of edging module 10 a distance equal to half the thickness of slot forming fin 54 of connecting module 42, and extends down from top surface 12 between first vertical support wall 14 and second vertical support wall 16 as can best be seen in FIG. 2. Cross support 26 is shaped such that it will not touch top edging surface 12 when a plurality of edging modules 10 are stacked on top of each other. Flanges 20 are parallel to top surface 12 and extend out from vertical support walls 14 and 16, forming the base of edging module 10. A plurality of stacking support members 18 project upward from flange 20 and have a common surface with vertical support walls 14 and 16. Stacking support members 18 are located along flange 20 at intervals allowing the support of another unit of edging module 10 resting on top of a first unit of edging module 10. Stacking support member 18 projects upward from flange 20 to a height equal to knob receiver 28. In the preferred embodiment of the present invention stacking support members 18 are generally shaped as planar, rectangular, wing extensions.

Anchoring sheath 22 possesses a means, such as opening 24 for receiving an anchoring means. In the preferred embodiment of this invention, opening 24 passes through anchoring sheath 22 at an angle, such that an anchoring means would enter the ground angled towards the center of edging module 10.

Figure 2A:
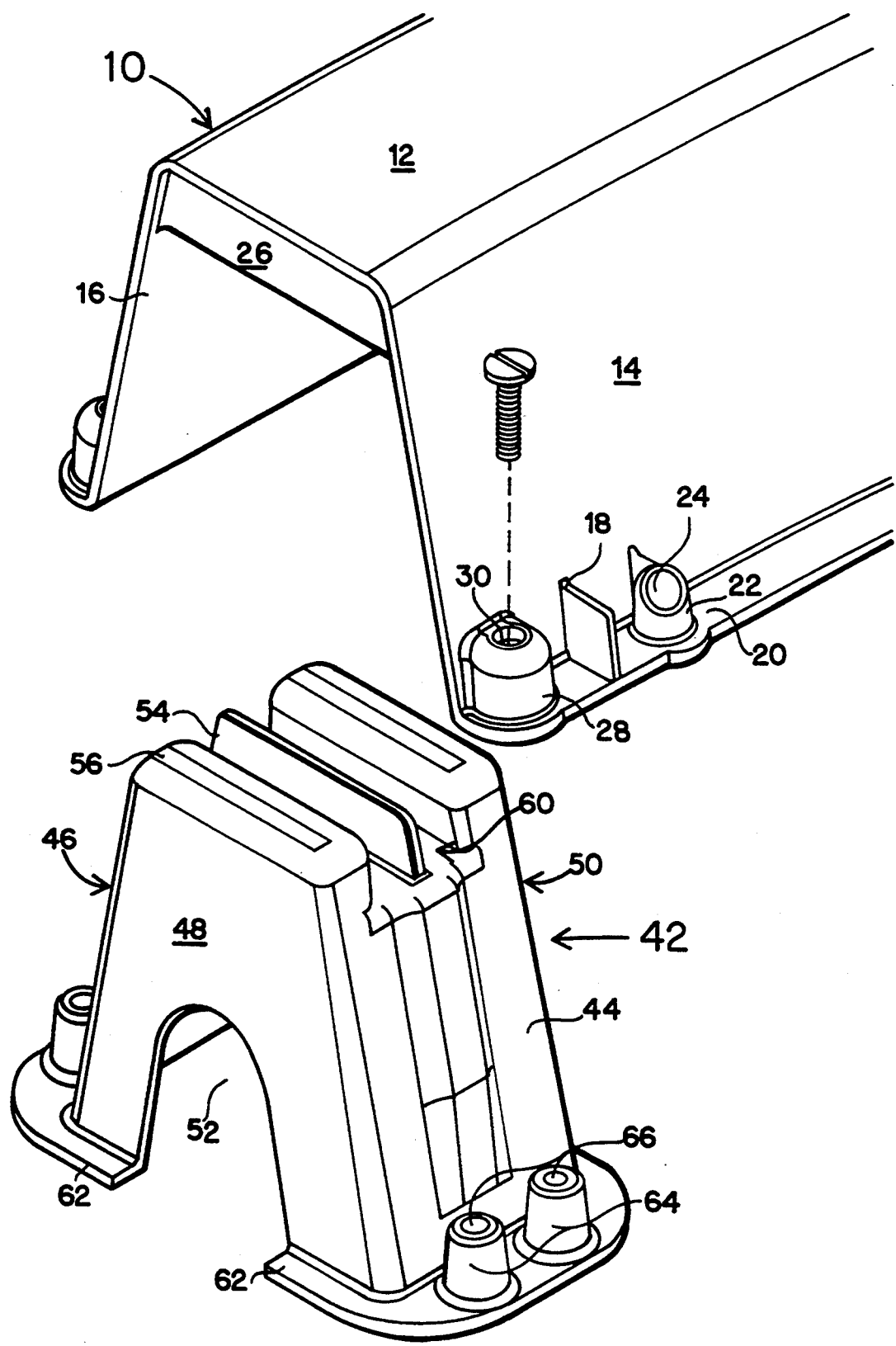
FIG. 2A is a representational perspective view of the preferred embodiment of the present invention showing the relationship between the edging module and the connecting module.
Figure 2B:
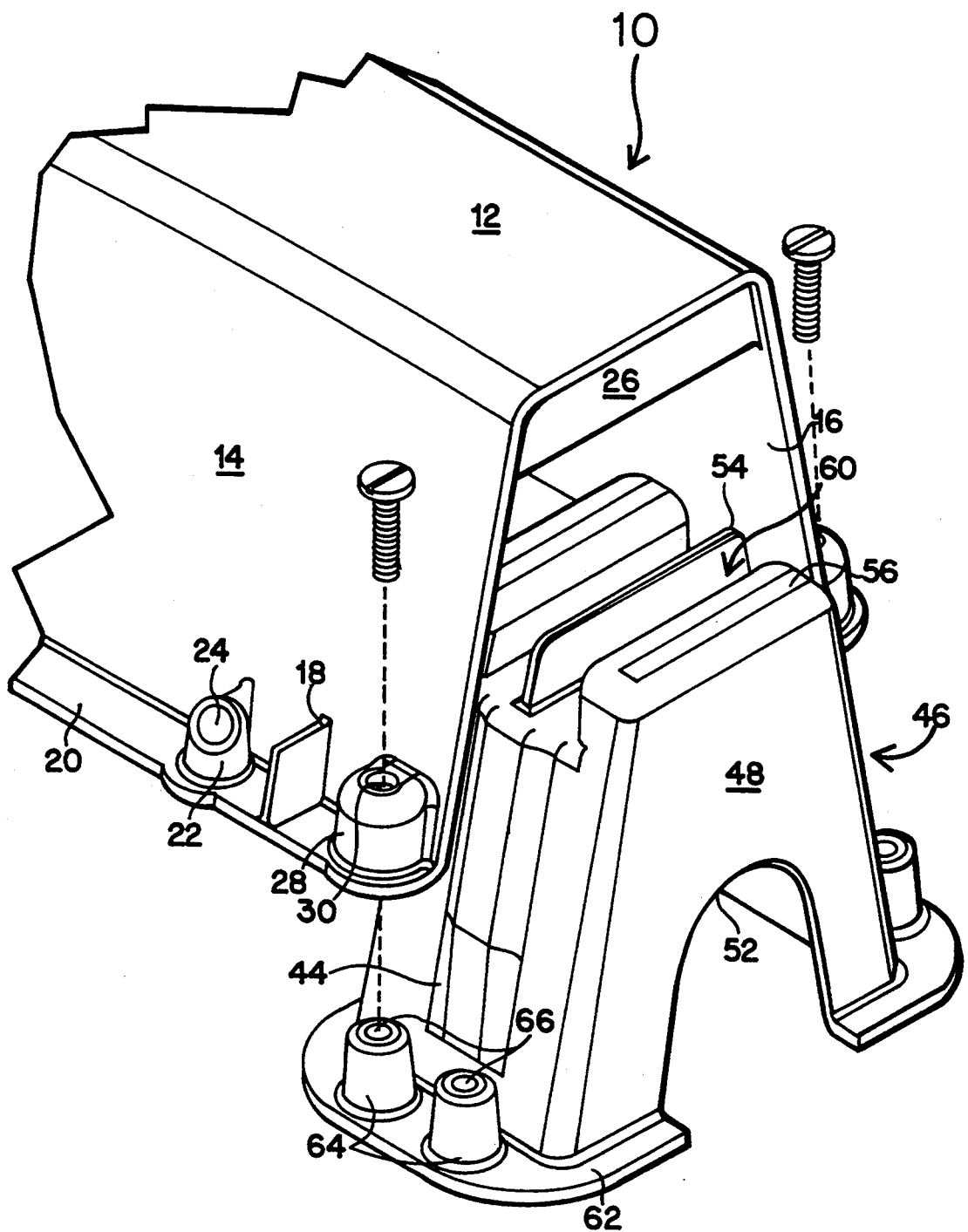
FIG. 2B is a representational perspective view of the preferred embodiment of the present invention showing the relationship between the edging module and the connecting module.

Knob receivers 28 project upward from flange 20 and have a common surface with vertical support walls 14 and 16. Knob receivers 28 are positioned at the ends of edging module 10. Knob receiver 28 includes a means, such as opening 30, for receiving a module securing means, as shown in FIGS. 1, 2A and 2B. In the preferred embodiment a thread forming screw can be used for the module securing means.

Figure 7:
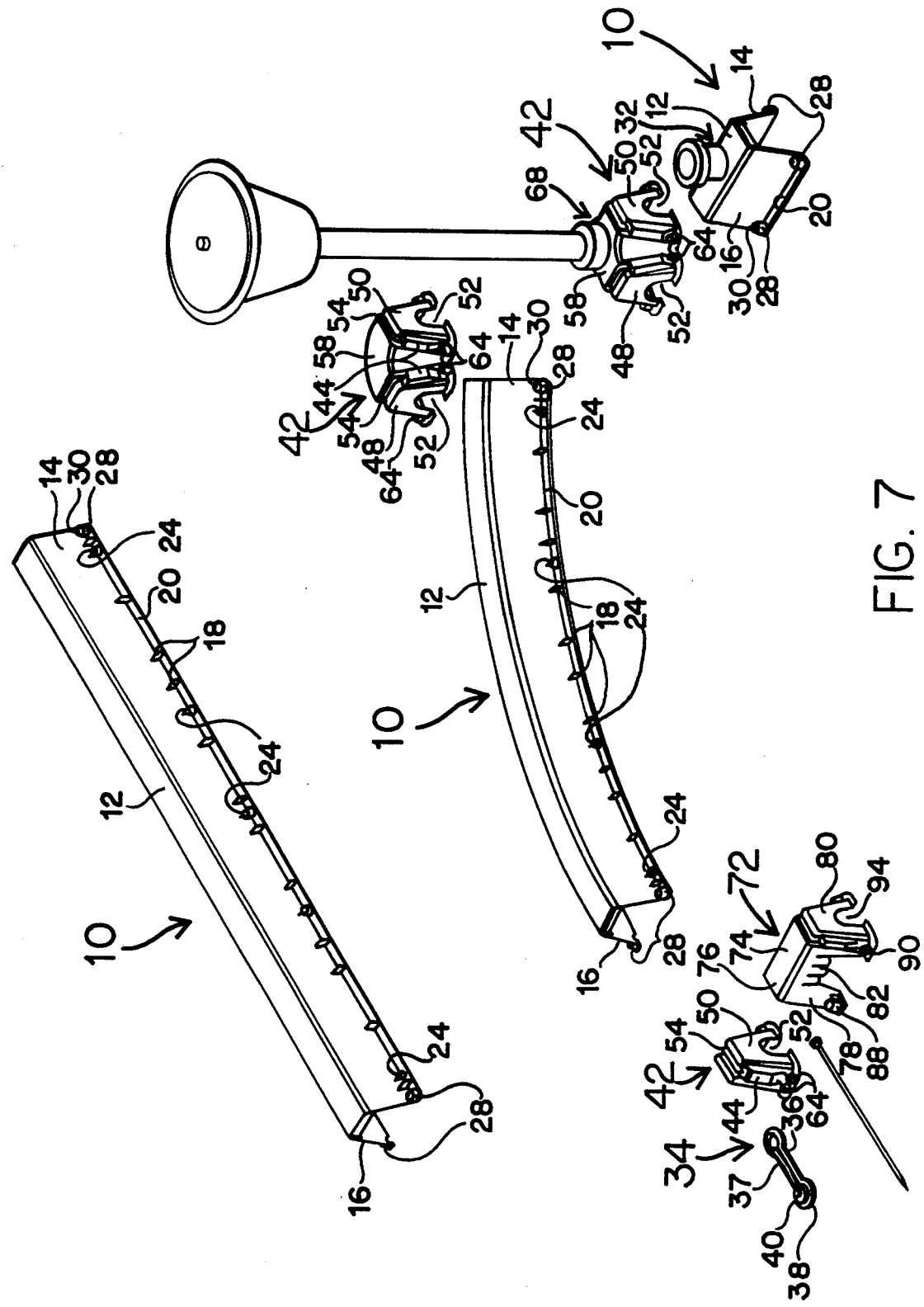
FIG. 7 is a representational perspective view of the present invention showing the various embodiments of the invention.

Edging module 10 can be straight or curved. In one embodiment of this invention, edging module 10 has a curve of 10° with first vertical support wall 14 having a shorter length than second vertical support wall 16, to accommodate the curve as can be seen in FIG. 7.

In another embodiment of this invention, edging module 10 can have curves of 20°, 30° or 60°. It should be noted that any curvature can be incorporated into edging module 10. A curved edging module 10 can be seen in FIG. 7. In still another embodiment of this invention, top edging surface 12 of edging module 10 possesses top surface accessory opening 32. Top surface accessory opening 32 provides a means for including customized accessories within the edging system, for example a light post or sprinkler head as can be seen in FIGS. 5, 6B and 7.

Connecting module 42 generally is comprised of top support surface 56, slot-forming fin 54, first vertical support wall 44 and second vertical support wall 46, and first side wall 48 and second side wall 50. A flange 62 circumscribes the base of connector module 42. A plurality of knobs 64, here four, are formed in flange 62. Knobs 64 are positioned in pairs, one pair being Located at the base of first vertical support wall 44 and the other pair being located at the base of second vertical support wall 46. Knob 64 is sized to interfit knob receiver 28 of edging module 10 and contains a means, such as opening 66, for receiving a module securing means. The module securing means in the preferred embodiment is a thread forming screw.

Top support surface 56 of connecting module 42 includes a recess divided by slot-forming fin 54, forming a pair of cross support receiving slots 60. In one embodiment of the invention first side wall 48 possesses a pass through opening, here duct forming arch 52, and second side wall 50 is an uninterrupted panel. Duct forming arches 52 create a conduit within the edging system for electrical wires, pipe or other inclusions that may be required when incorporating lighting, sprinklers or other ornaments into the edging. In another embodiment of connecting module 42, both first side wall 48 and second side wall 50 contain arch 52 as can be seen in FIGS. 2a and 2b.

Figure 5:
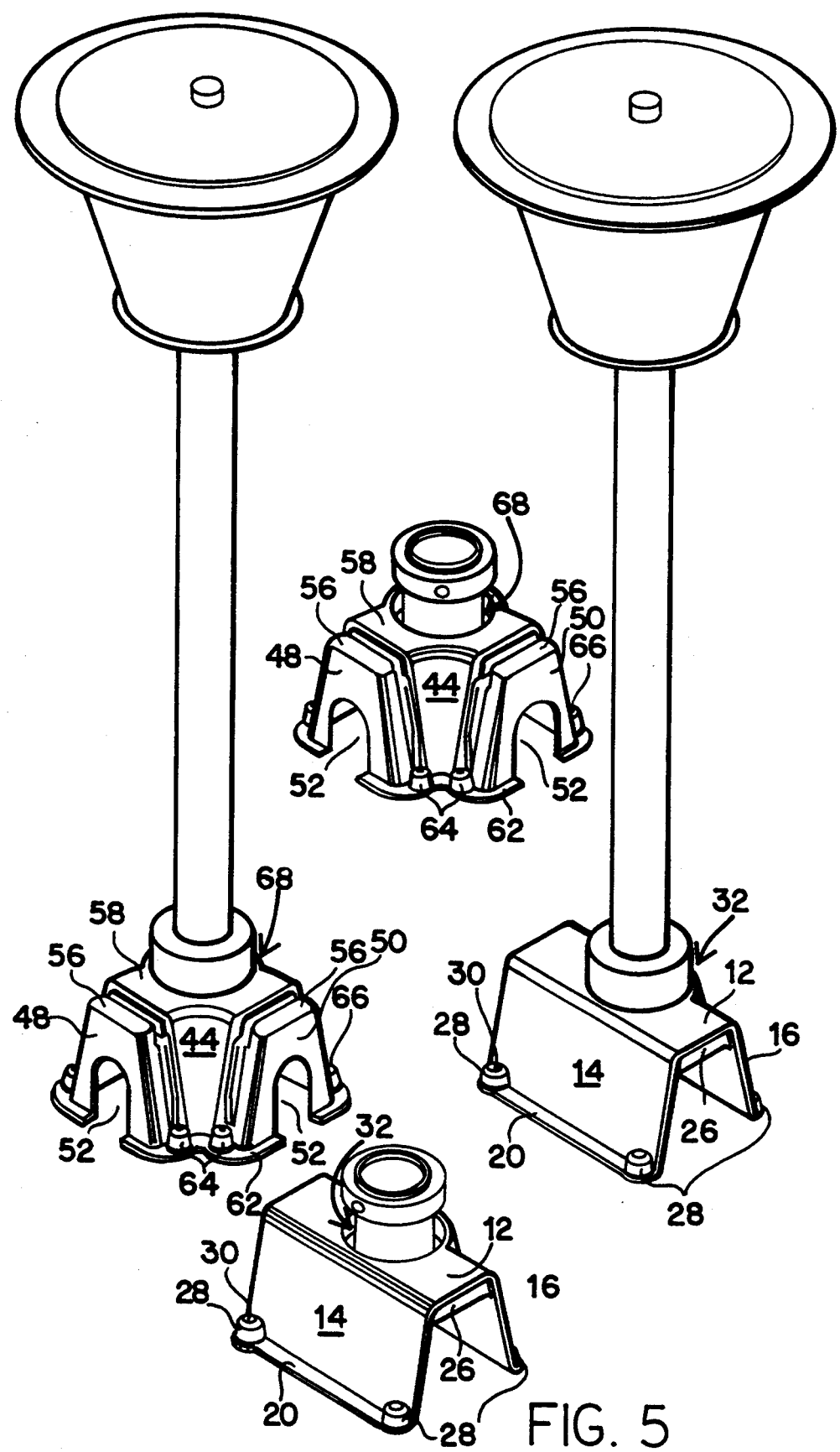
FIG. 5 is a representational perspective view of the present invention showing embodiments of the accessory opening of the present invention in use.
Figure 6B:
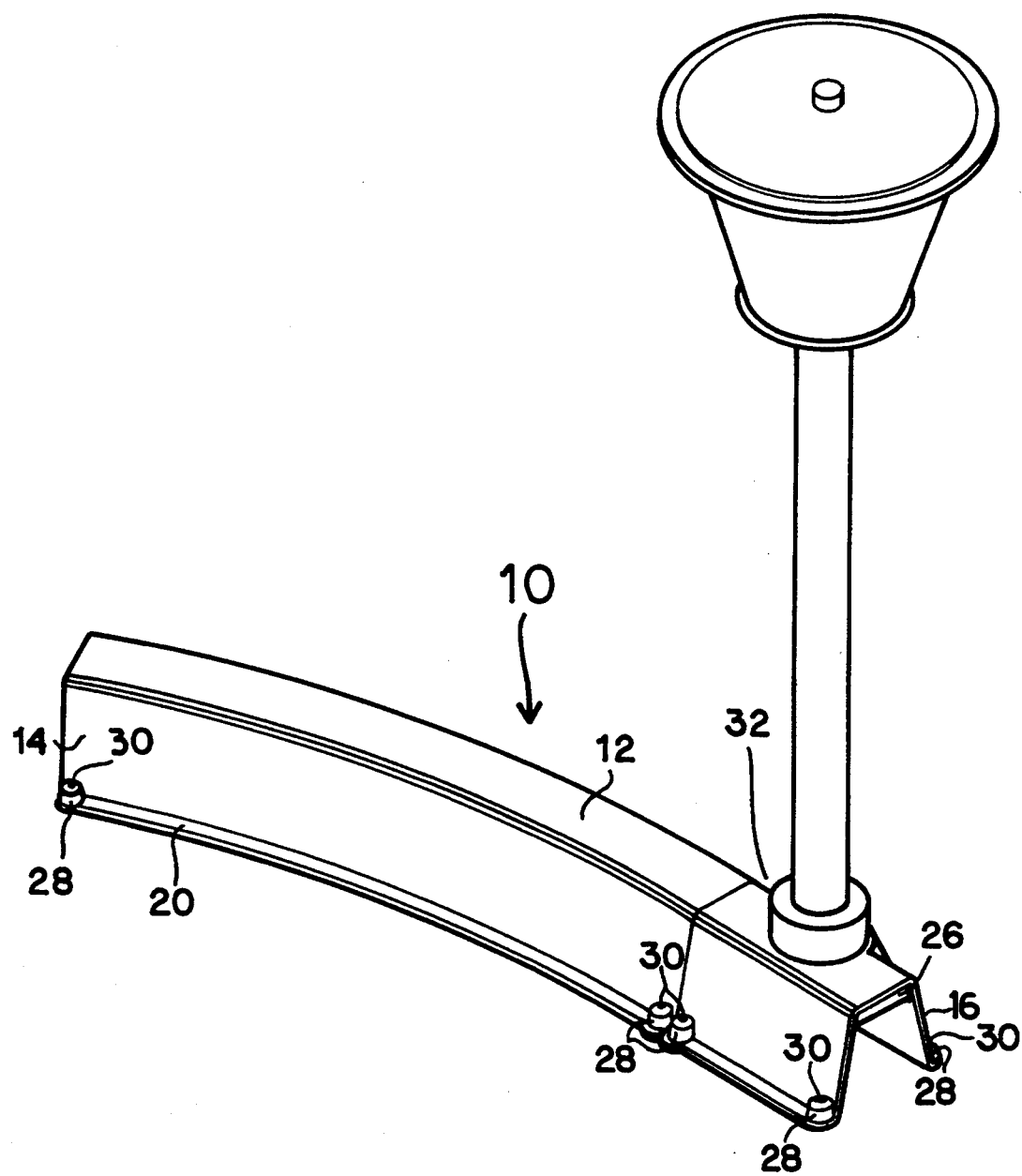
FIG. 6B is a representational perspective view of the present invention showing the fit of a pair of the edging modules with a connecting module.

In another embodiment of this invention, connecting module 42 is curved, here establishing a 90° angle between first side wall 48 and second side wall 50, creating a corner connecting module 42, as shown in FIGS. 3, 5 and 7. Corner connecting module 42 has a top edging surface 58, a first curved vertical support wall 44 and a second curved vertical support wall 46. The first vertical support wall 44 is shorter in length than second vertical support wall 46, to accommodate the curve. Corner connecting module 42 possesses two slot forming fins 54, one adjacent to first side wall 48 and the second fin 54 adjacent to second side wall 50 being separated from side wall 50 and located across from top support surface 56 defining cross support receiving slot 60 as can be seen in FIG. 3.

Knobs 64 are positioned on flange 62 at the base of cross support receiving slot 60, adjacent to both first vertical support wall 44 and second vertical support wall 46. In one embodiment of this invention, first side wall 48 and second side wall 50 of corner connecting module 42 both contain duct forming arches 52. In any embodiment of this invention top edging surface 58 of corner connecting module 42 can possess accessory opening 68 as seen in FIGS. 5 and 7.

Figure 4A:
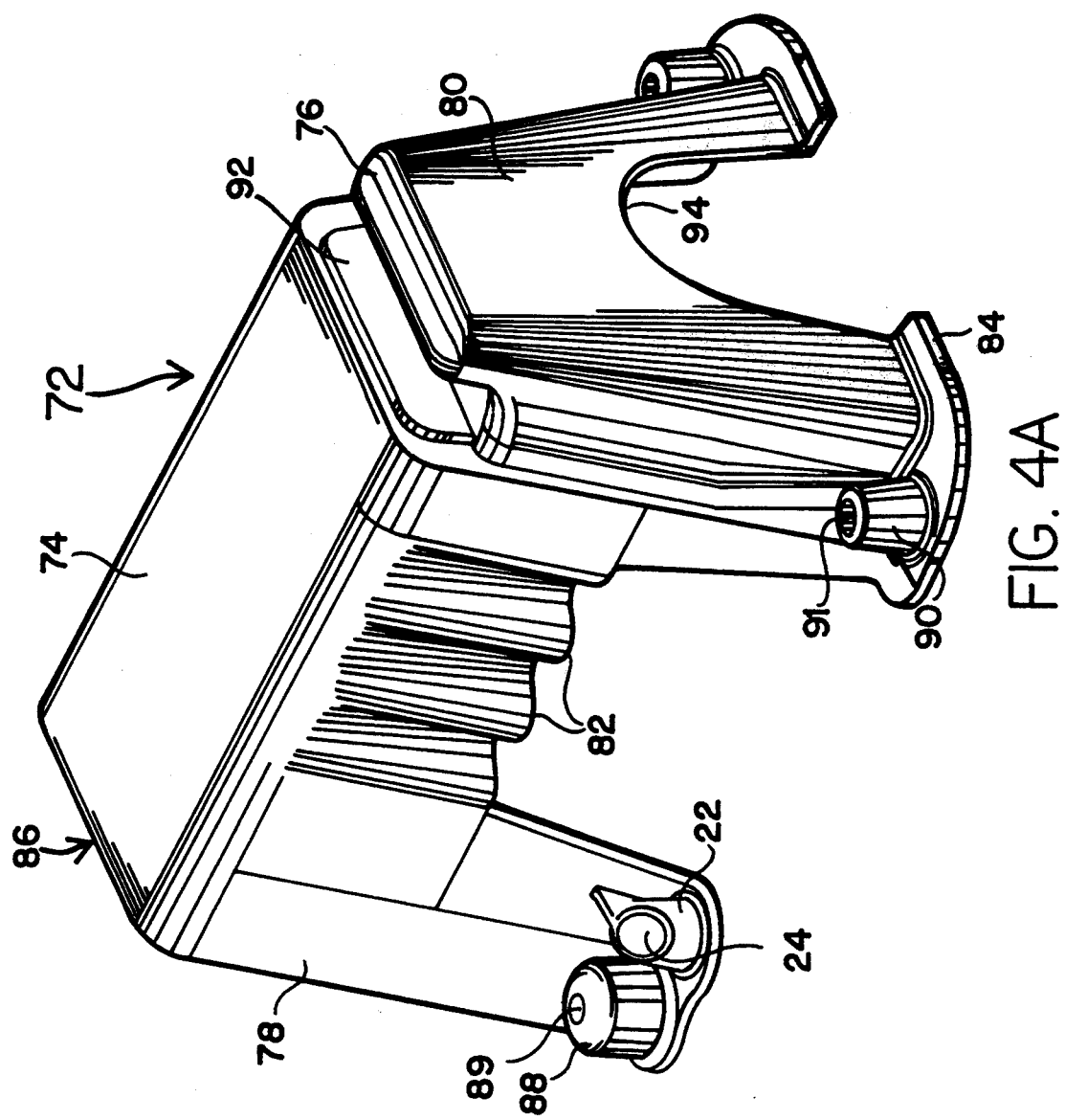
FIG. 4A is a representational perspective view showing a preferred embodiment of the grade changing module of the present invention.
Figure 4B:
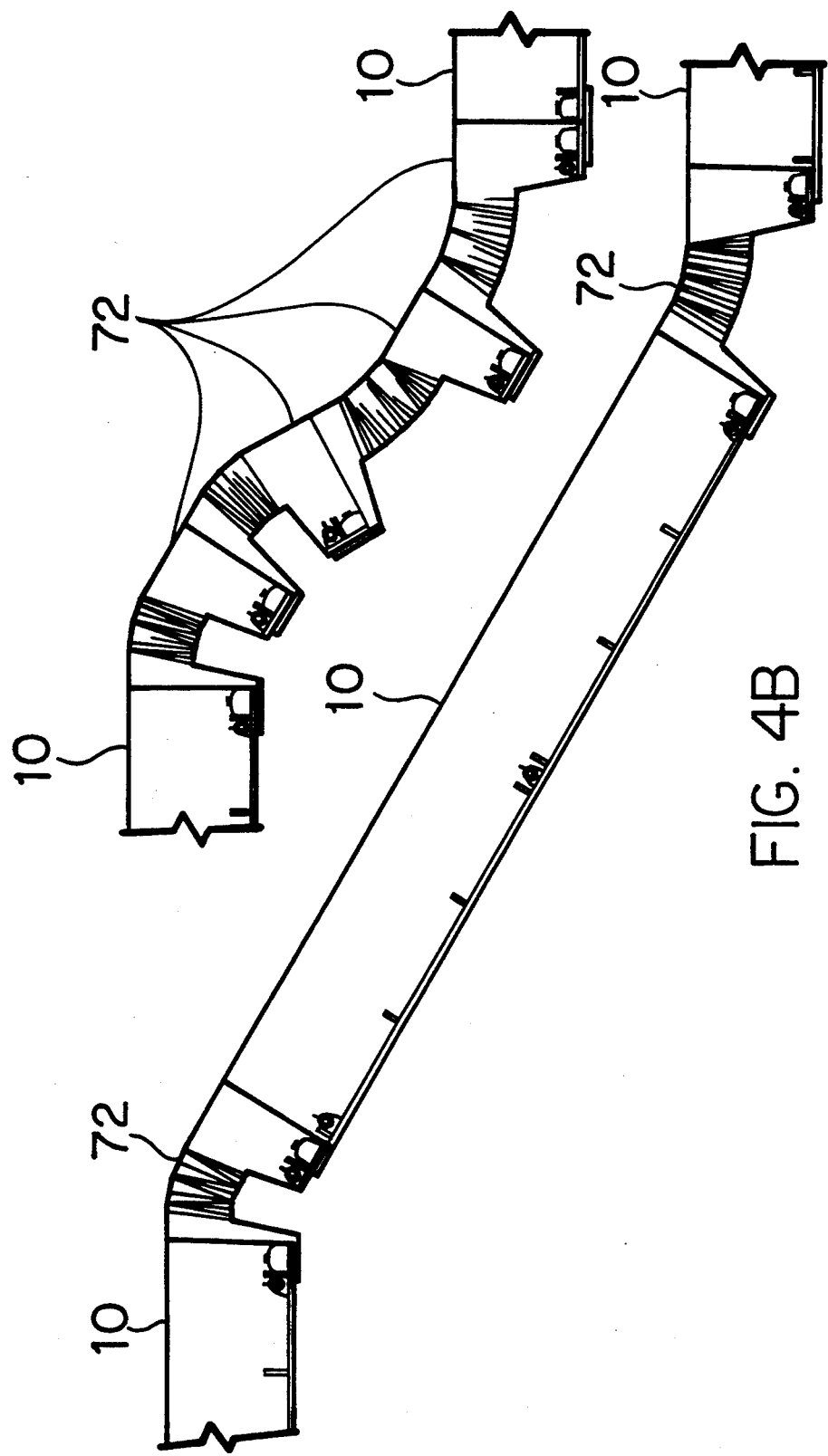
FIG. 4B is a side view showing the grade changing module in use.

In another embodiment of this invention the edging system can include grade changing module 72 as seen in FIG. 4A. Grade changing module 72 generally is comprised of top edging surface 74, top support surface 76, a pair of vertical support walls 78, side wall 80, a pair of flanges 84, recessed cross support member 86, a plurality of knob receivers 88, a plurality of knobs 90, and slot forming fin 92. Vertical support walls 78 are attached to top edging surface 74 in the same manner as in edging module 10. One end of grade changing module 72 is configured to be analogous to edging module 10, with recessed cross support member 86, flange 84 and a pair of knob receivers 88. Knob receivers 88 include a means, such as opening 89, for receiving a security means. The opposite end of grade changer 72 is configured to be analogous to connector module 42, with top support surface 76 including a central recess and slot forming fin 92 and knobs 90. Knobs 90 include a means, such as opening 91, for receiving a securing means. Side wall 80 possesses a pass through opening, here duct forming arch 94, allowing the passage of wiring or pipes inside edging system on graded ground. Vertical support walls 78 contain a plurality of vertical support wall pleats 82. Vertical support wall pleats 82 allow grade changer module 72 to connect a unit of edging module 10 and connector module 42 on a graded surfaces as can be seen in FIG. 4B.

Figure 8A:
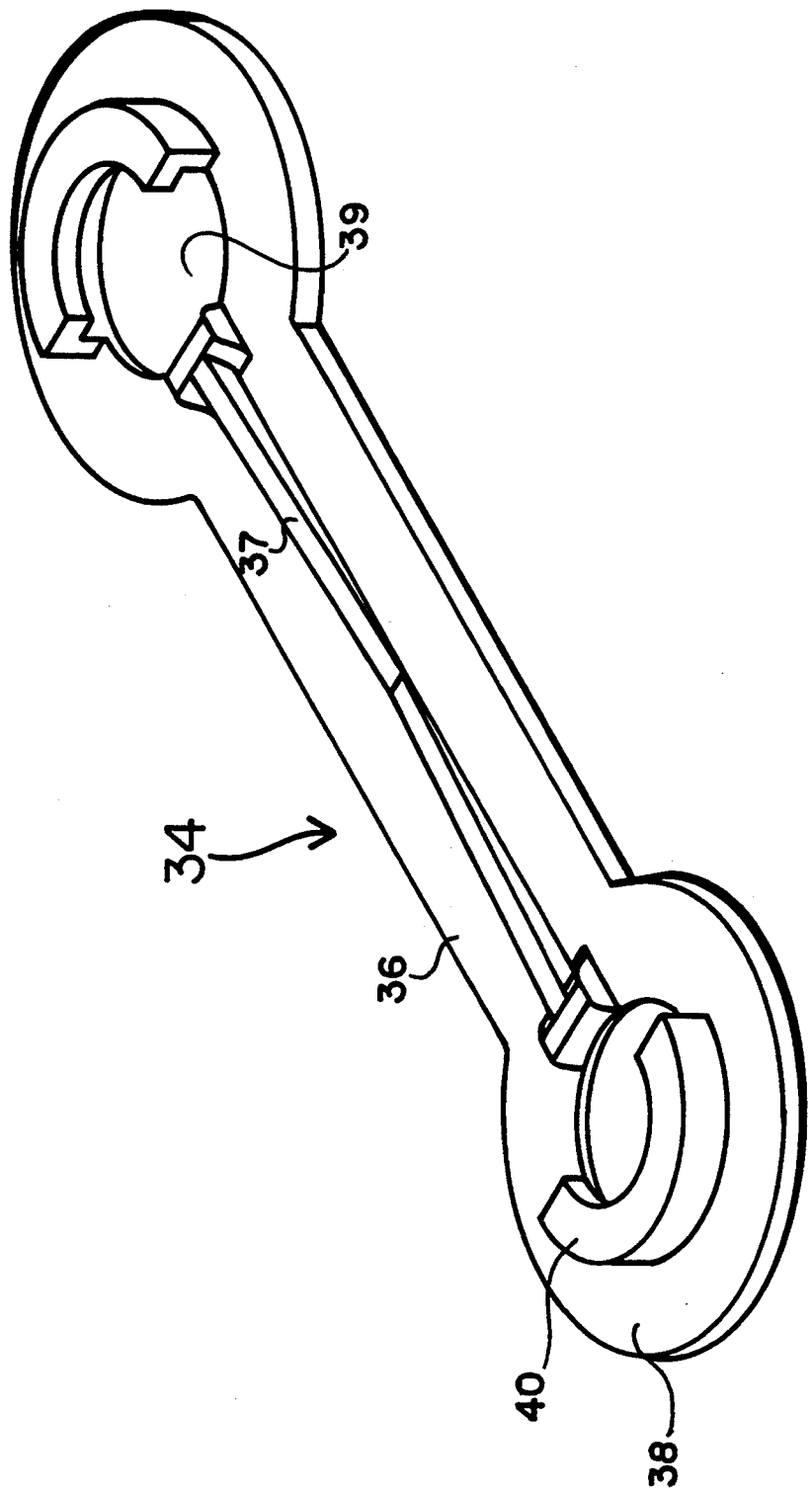
FIG. 8A is a representational perspective view of the present invention showing the details of the module structure reinforcing spanner.
Figure 8B:
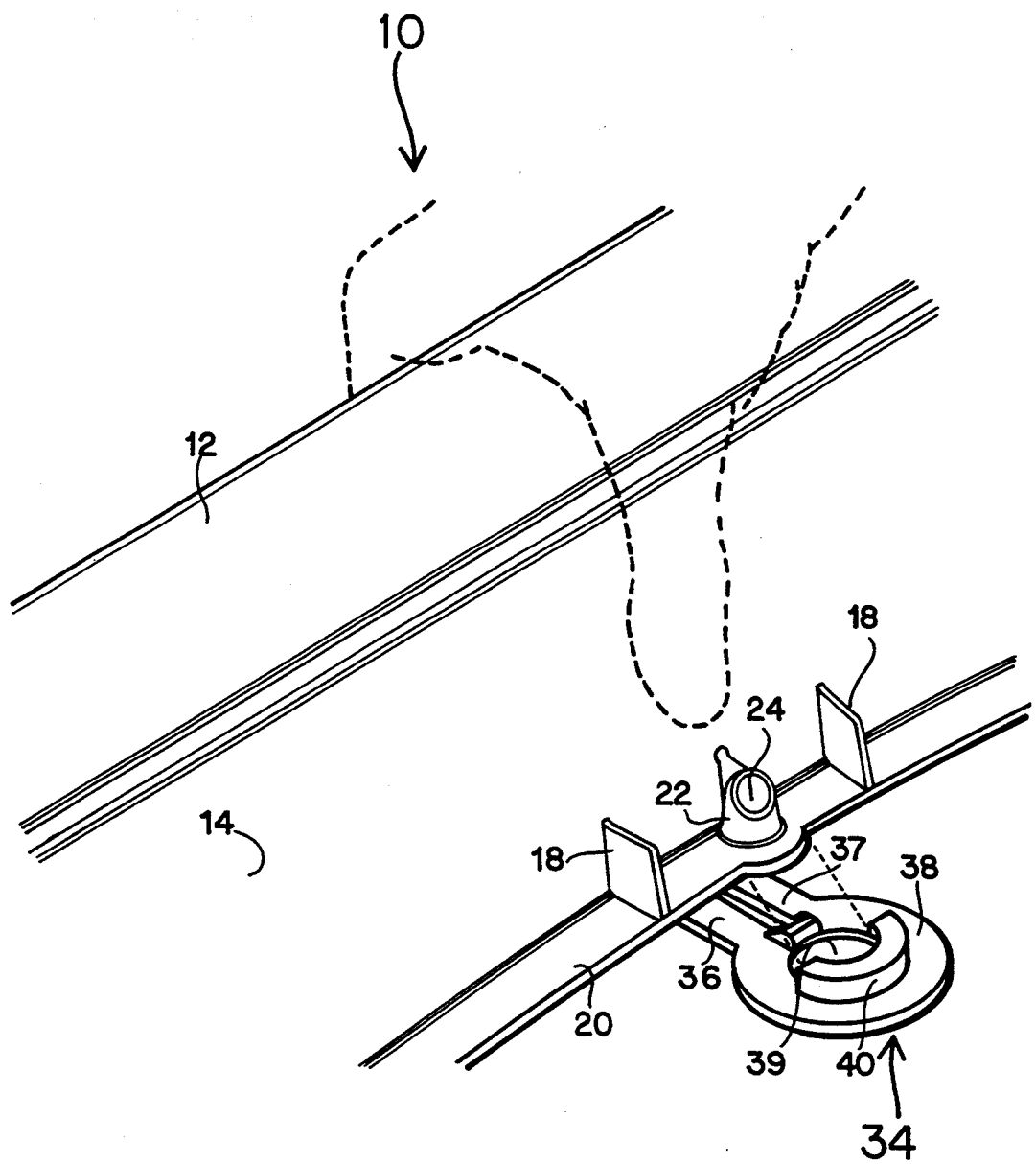
FIG. 8B is a detailed view showing the use of the module structure reinforcing spanner with the edging module of the present invention.
Figure 9:
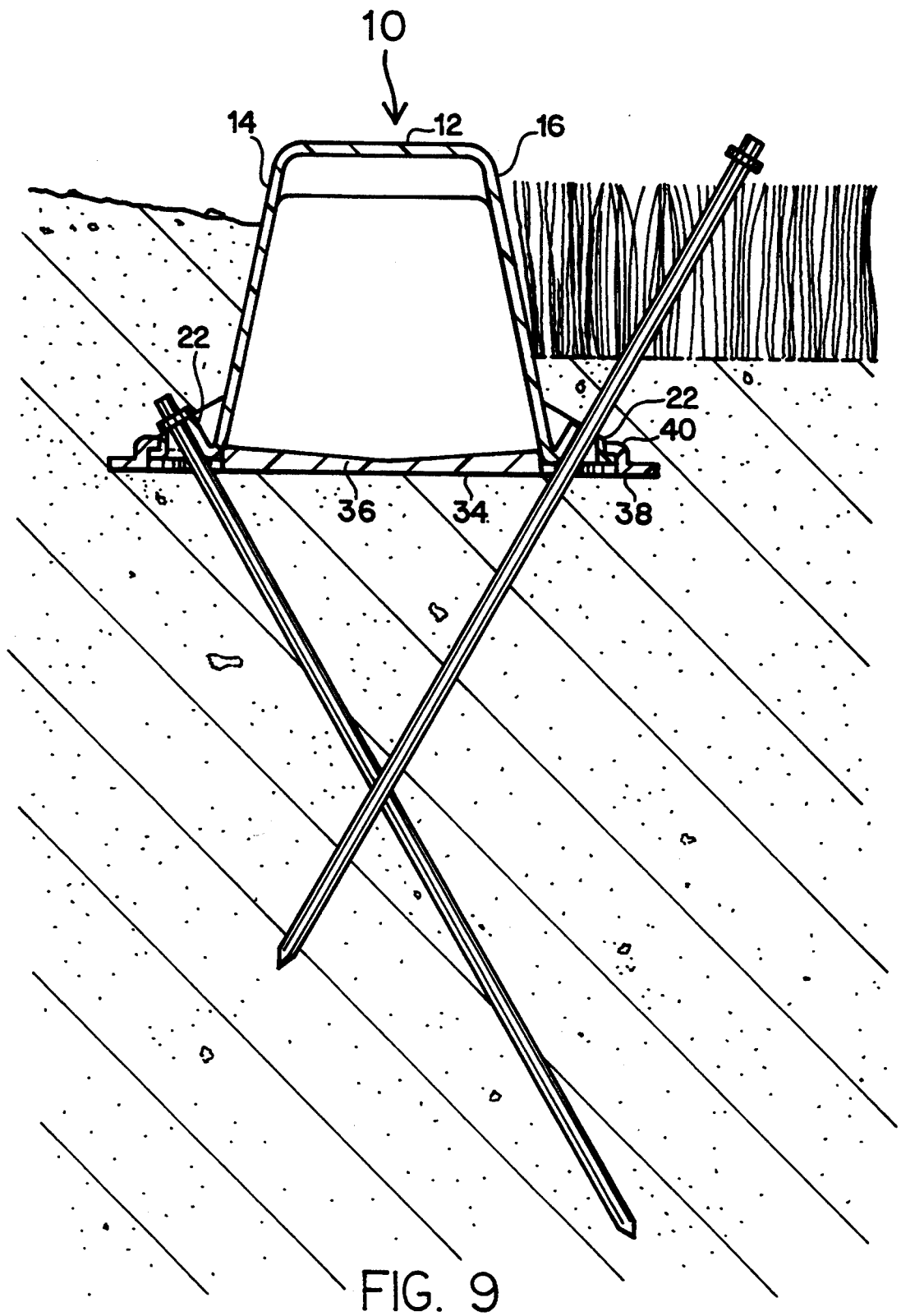
FIG. 9 is a cross section view of the present invention showing the details of the means for anchoring the edging modules of the present invention.

In any embodiment of this invention there can be included module reinforcing spanner member 34, as can be seen in FIG. 8. Spanner member 34 is comprised of cross member 36 and a pair of flange receiving members 38 at each end of spanner 34, as shown in FIG. 8A. Preferably flange receiving members 38 possess a pair of raised flange retaining lips 40 located opposite each other and aligned with cross member 36. Spanner 34 can also include rib 37 along the length of cross member 38. Rib 37 provides structural rigidity to spanner 34. Lips 40 are shaped with complementary symmetry to flange 20 of edging module 10, such that flange 20 of edging module 10 interfits between lips 40, as shown in FIGS. 8B and 8C. Additionally members 38 possess a center anchor receiving opening 39 allowing an anchoring means to pass through spanner 34 when edging module 10 is interfit in lips 40. Spanner 34 has a length at least equal to the distance between the outside edges of flange 20 of edging module 10, such that spanner 34 can be positioned under edging module 10 and flange 20 will fit inside lips 40 of flange receiving member 38 while allowing an anchoring means to pass through both anchoring sheath 22 and spanner 34, as can be seen in FIG. 8B. Spanner 34 functions to prevent the collapse and spreading of edging module 10 when edging module 10 is installed in the ground.

In use, edging module 10 is placed with recessed cross support 26 positioned in cross member receiving slot 60 of connector module 42 and knob receiver 28 of edging 10 overfitting knob 64 of connector 42, as shown in FIGS. 2A and 2B. A second edging module 10 is then positioned within cross member receiving slot 60 of connector 42, so that juxtaposed edging modules 10 have top edging surface 12 in flush contact and connector 12 is not visible, as shown in FIGS. 6A and 6B. This sequence is repeated until the desired configuration of the combination of edging modules 10 and connector modules 42 is achieved. In the preferred embodiment edging modules 10 are secured to connector module 42 using a thread forming screw, as shown in FIG. 2B. Spanner 34 is then attached to flange 20 at the location of anchoring sheath 22 as can be seen in FIGS. 8B and 8C. Different embodiments of edging module 10 can be utilized in the configuration to achieve a desired result. For example, edging module 10 with top surface accessory opening 32 can be introduced into the configuration to provide an opening for a desired custom accessory to the edging, such as a lamp, a sprinkler head, sign or other desired ornament. Different embodiments of connecting module 42 can also be introduced into the combination to provide more options. For example, 90° corner connecting modules 42 can be used to make square corners in the edging configuration. Alternatively, 90° corner connectors 42 possessing top surface accessory opening 68 can be incorporated into the edging border allowing inclusion of lamp posts, sprinkler heads or other lawn ornaments. Edging module 10 is shaped with recessed cross support 26 and connecting module 42 is shaped with duct forming arch 52, providing a conduit within the edging system for electrical wires, pipes or other inclusions when incorporating lamps or sprinklers or other ornaments.

Figure 10:
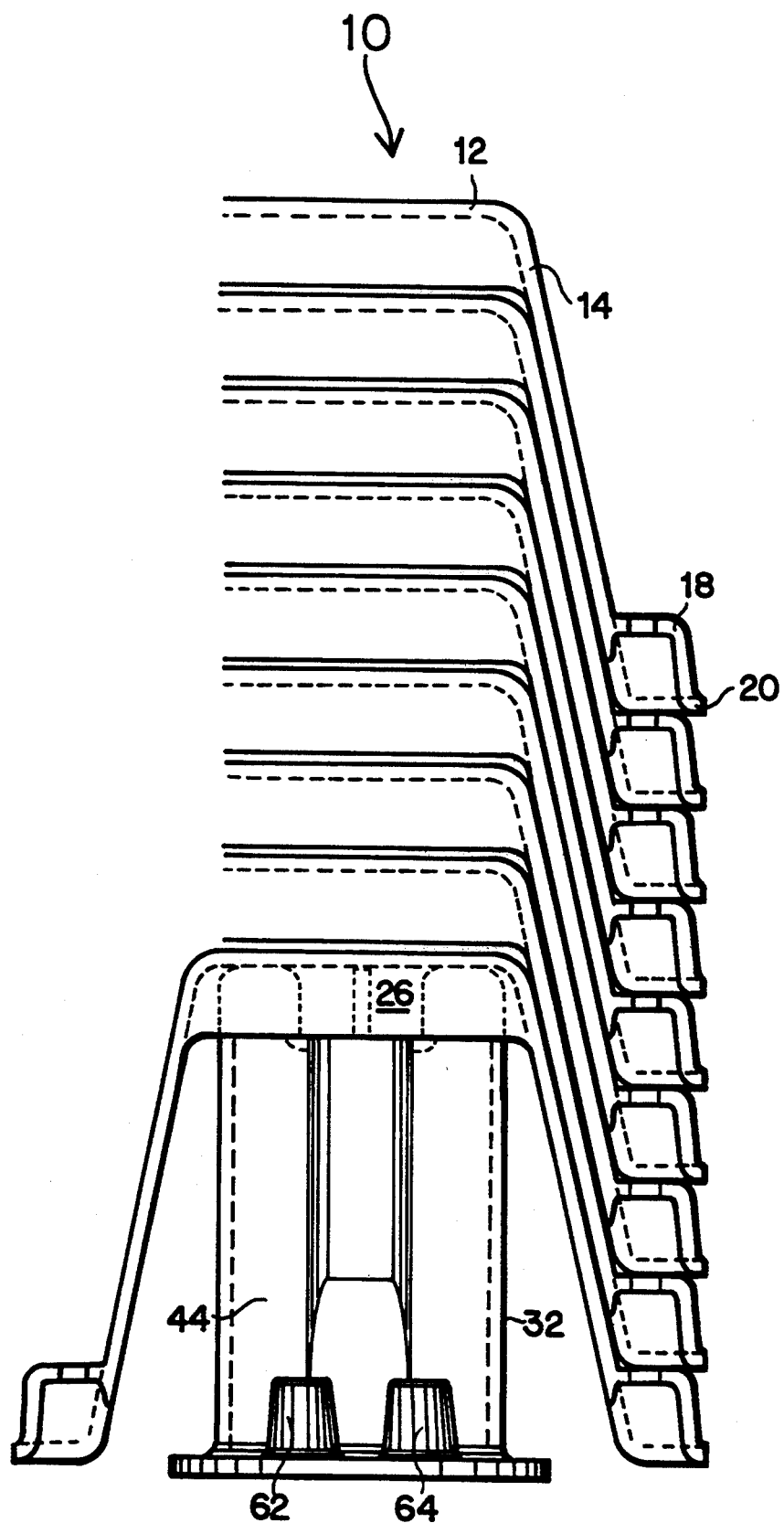
FIG. 10 is an end section view showing the stacking feature of the present invention.

Edging module 10 and connector module 42 can be stacked for shipping. When stacking a plurality of edging modules 10, knob receivers 28 and stacking support members 18 allow a plurality of modules 10 to overfit each other in a stackable fashion without top edging surface 12 of any module 10 contacting top-edging surface 12 of any other module 10, as shown in FIG. 10.

While there is shown and described the present preferred embodiment of the invention, it is to be distinctly understood that this invention is not limited thereto but may be variously embodied to practice within the scope of the following claims.

I claim:

1. A modular landscape edging system comprising:
   (a) a generally V-shaped edging module having: a top surface, a pair of vertical support walls, a pair of flanges at the base of the vertical support walls, a pair of recessed cross support members extending downward from the top planar edging surface between the vertical support walls, a means for receiving an anchoring means; and
   (b) a connecting module having: a top support surface possessing a recess, a cross support receiving slot, a first and second vertical support wall, a first and second side wherein both side walls possess a pass through opening, a flange circumscribing the base of the vertical support walls and first and second side walls, a means for receiving an anchoring means; and
   (c) an anchoring means.

2. The modular landscape system of claim 1 wherein the connecting module further comprises a top planar edging surface.

3. A modular landscape edging system comprising:
   (a) a generally V-shaped edging module having a top planar edging surface, a pair of vertical support walls, a pair of recessed cross support members extending downward from the top planar edging surface between the vertical support walls, a pair of flanges at the base of the vertical support walls, a plurality of knob receivers, and a means for receiving an anchoring means;
   (b) a connecting module shaped with complementary and reciprocal interlocking symmetry to the edging module, having a top support surface possessing a plurality of recesses, a slot forming fin disposed within each top support surface recess and forming a cross support receiving slot; a top planar edging surface; a first and second vertical support wall, a first and second side wall wherein both side walls possess a pass through opening, a flange circumscribing the base of the module, a plurality of knobs shaped to interfit the knob receivers of the edging module, a means for receiving an anchoring means; and
   (c) an anchoring means.

4. The edging system of claim 3 wherein the edging module is shaped such that it is stackable.

5. The edging system of claim 4 wherein the edging module further possesses a generally circular accessory opening in the top planar surface.

6. The edging system of claim 4 wherein the edging module is curved in an arc.

7. The edging system of claim 6 wherein the curved edging module further possesses a generally circular accessory opening in the top planar surface.

8. The edging system of claim 4 wherein the connecting module is curved with an arc that creates an angle between the first and second side wall of the connecting module.

9. The edging system of claim 5 wherein the connecting module is curved with an arc that creates an angle between the first and second side wall of the connecting module.

10. The edging system of claim 6 wherein the connecting module is curved with an arc that creates an angle between the first and second side wall of the connecting module.

11. The edging system of claim 7 wherein the connecting module is curved with an arc that creates an angle between the first and second side wall of the connecting module.

12. The edging system of claim 8 wherein the angled connecting module possesses a generally circular accessory opening.

13. The edging system of claim 5 wherein the angled connecting module possesses a generally circular accessory opening.

14. The edging system of claim 6 wherein the angled connecting module possesses a generally circular accessory opening.

15. The edging system of claim 7 wherein the angled connecting module possesses a generally circular accessory opening.

16. The edging system of claim 4 further comprising a grade changing module having a:
   (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

17. The edging system of claim 5 further comprising a grade changing module having a:
   (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

18. The edging system of claim 6 further comprising a grade changing module having a:
   (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

19. The edging system of claim 7 further comprising a grade changing module having a:
  (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

20. The edging system of claim 8 further comprising a grade changing module having a:
  (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

21. The edging system of claim 12 further comprising a grade changing module having a:
  (a) top edging surface, a top support surface, with a central recess, a pair of vertical support walls, a side wall possessing a pass through opening, a pair of flanges at the base of the vertical support walls, a recessed cross support extending down from the top planar edging surface and between the vertical support walls, a plurality of knob receivers, each having a means for receiving an anchoring means, a plurality of knobs each having a means for receiving an anchoring means, a slot forming fin extending vertically upward from the recess of the top support surface; and a plurality of vertical support wall pleats allowing a distending disfiguration of the grade changing module to accommodate placement on graded surfaces.

22. The edging system of claim 4 further comprising an edging module spanner member shaped to fit in close juxtaposition to the anchoring means receiving openings of the edging modules.

23. The edging system of claim 5 further comprising an edging module spanner member shaped to fit in close juxtaposition to the anchoring means receiving openings of the edging modules.

24. The edging system of claim 6 further comprising an edging module spanner member shaped to fit in close juxtaposition to the anchoring means receiving openings of the edging modules.

25. The edging system of claim 7 further comprising an edging module spanner member shaped to fit in close juxtaposition to the anchoring means receiving openings of the edging modules.

26. The edging system of claim 8 further comprising an edging module spanner member shaped to fit in close juxtaposition to the anchoring means receiving openings of the edging modules.

27. The edging system of claim 12 further comprising an edging module spanner member shaped to fit in close juxtaposition to the anchoring means receiving openings of the edging modules.

28. The edging system of claim 16 further comprising an edging module spanner member shaped to fit in close juxtaposition to the anchoring means receiving openings of the edging modules.

29. The edging system of claim 16 further comprising a plurality of anchoring means pins.

30. A modular landscape edging system comprising:
  a plurality of generally V-shaped edging modules having a top planar surface;
  a pair of vertical support walls with a recessed cross support member extending therebetween;
  a connecting module for anchoring the edging modules having a top surface, a cross support receiving slot, first and second sidewalls, first and second vertical support walls; and
  a means for anchoring the edging and connecting modules.

* * * * *